United States Patent
Oettli et al.

(10) Patent No.: US 12,331,616 B2
(45) Date of Patent: Jun. 17, 2025

(54) SYSTEM AND METHOD FOR CREATING PRESSURE WAVES IN A WELL

(71) Applicant: Schlumberger Technology Corporation, Sugar Land, TX (US)

(72) Inventors: Mark Callister Oettli, Richmond, TX (US); Pierre Ramondenc, Clamart (FR); Charles Kearney, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/605,544

(22) Filed: Mar. 14, 2024

(65) Prior Publication Data
US 2024/0218760 A1    Jul. 4, 2024

Related U.S. Application Data

(63) Continuation of application No. 17/757,505, filed as application No. PCT/US2020/065265 on Dec. 16, 2020, now Pat. No. 11,959,362.
(Continued)

(51) Int. Cl.
*E21B 41/00* (2006.01)
*E21B 23/04* (2006.01)
(Continued)

(52) U.S. Cl.
CPC .......... *E21B 41/00* (2013.01); *E21B 23/0416* (2020.05); *E21B 31/005* (2013.01);
(Continued)

(58) Field of Classification Search
CPC .... E21B 41/00; E21B 23/0416; E21B 31/005; E21B 37/00; E21B 47/04; E21B 49/08
See application file for complete search history.

(56) References Cited

U.S. PATENT DOCUMENTS

| | | |
|---|---|---|
| 5,836,393 A | 11/1998 | Johnson |
| 6,241,019 B1 | 6/2001 | Davidson |

(Continued)

FOREIGN PATENT DOCUMENTS

| | | |
|---|---|---|
| EP | 2245263 A1 | 11/2010 |
| WO | 2009089622 A1 | 7/2009 |

(Continued)

OTHER PUBLICATIONS

International Search Report and Written Opinion issued in International Patent application PCT/US2020/065265 on Apr. 9, 2021, 8 pages.

(Continued)

*Primary Examiner* — Crystal J Lee
(74) *Attorney, Agent, or Firm* — Jeffrey D. Frantz

(57) ABSTRACT

A technique facilitates controlled creation of pressure waves in a downhole environment. The technique enables creation of, for example, dynamic underbalance (DUB) pressure waves or dynamic overbalance (DOB) pressure waves which can be used to perform desired activities downhole. According to an embodiment, a pump is coupled with a pressure chamber and conveyed downhole into a borehole to a desired location. The pump may be operated downhole to change a pressure level in the pressure chamber until a sufficient pressure differential exists between an interior and an exterior of the pressure chamber. A release mechanism in communication with the pressure chamber is then rapidly opened to establish the desired pressure wave as the differing pressures equalize.

19 Claims, 2 Drawing Sheets

Related U.S. Application Data

(60) Provisional application No. 62/951,066, filed on Dec. 20, 2019.

(51) Int. Cl.
  *E21B 31/00* (2006.01)
  *E21B 37/00* (2006.01)
  *E21B 47/04* (2012.01)
  *E21B 49/08* (2006.01)

(52) U.S. Cl.
  CPC .............. *E21B 37/00* (2013.01); *E21B 47/04* (2013.01); *E21B 49/08* (2013.01)

(56) References Cited

U.S. PATENT DOCUMENTS

| | | | |
|---|---|---|---|
| 2008/0302528 A1* | 12/2008 | Samaroo | E21B 28/00 166/249 |
| 2009/0200019 A1 | 8/2009 | DeLaCroix | |
| 2010/0290313 A1* | 11/2010 | Groves | E21B 28/00 367/82 |
| 2015/0308233 A1 | 10/2015 | Parker | |
| 2016/0265351 A1* | 9/2016 | Gajji | E21B 47/18 |
| 2019/0203567 A1* | 7/2019 | Ross | E21B 49/008 |
| 2021/0071502 A1 | 3/2021 | Gettis | |

FOREIGN PATENT DOCUMENTS

| | | |
|---|---|---|
| WO | 2014025279 A1 | 2/2014 |
| WO | 2015099663 A1 | 7/2015 |

OTHER PUBLICATIONS

International Preliminary Report on Patentability issued in International Patent application PCT/US2020/065265 on Jun. 30, 2022, 6 pages.

Extended Search Report issued in European Patent Application No. 20902426.4 dated Oct. 9, 2023, 7 pages.

Substantive Exam issued in Saudi Arabia Patent Application No. 522433028 dated Dec. 25, 2023, 14 pages with English translation.

* cited by examiner

SYSTEM AND METHOD FOR CREATING PRESSURE WAVES IN A WELL

CROSS-REFERENCE TO RELATED APPLICATION

The present document is a continuation of U.S. patent application Ser. No. 17/757,505, filed Jun. 16, 2022, which is a National Stage Entry of International Application No. PCT/US2020/065265, filed Dec. 16, 2020, which is based on and claims priority to U.S. Provisional Application Ser. No. 62/951,066, filed Dec. 20, 2019, which is incorporated herein by reference in its entirety.

BACKGROUND

In many well applications, pressure waves occur downhole in a wellbore during various operations. For example, a pressure wave may be created when the interior chamber of a perforating gun is opened during a perforating event. Additionally, certain types of downhole equipment may utilize burst discs or rupture plates. If rupture of such a device occurs, a one-time pressure wave may result downhole. Sometimes the creation of pressure waves can be beneficial due to, for example, the resulting movement of debris or other materials downhole. However, the lack of control over creation of desired pressure waves and the lack of repeatability limits their beneficial use.

SUMMARY

In general, a methodology and system provide for controlled creation of pressure waves in a downhole environment. The technique enables creation of, for example, dynamic underbalance (DUB) pressure waves or dynamic overbalance (DOB) pressure waves which can be used to perform desired activities downhole. According to an embodiment, a pump is coupled with a pressure chamber and conveyed downhole into a borehole to a desired location. The pump may be operated downhole to change a pressure level in the pressure chamber until a sufficient pressure differential exists between an interior and an exterior of the pressure chamber. A release mechanism in communication with the pressure chamber is then rapidly opened to establish the desired pressure wave as the differing pressures equalize. Furthermore, the creation of controlled pressure waves may be repeated while the pump and pressure chamber remain downhole.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
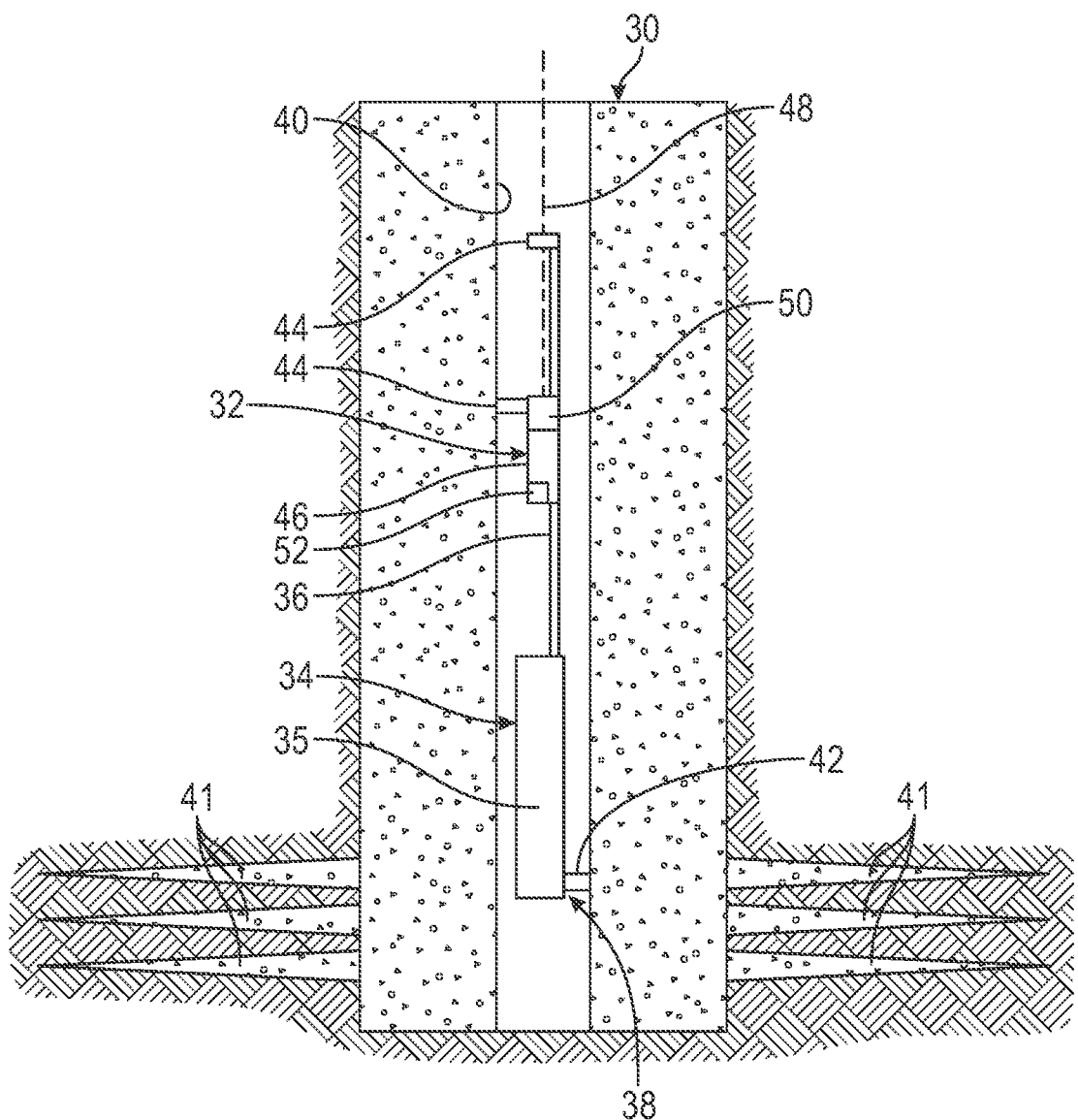
FIG. 1 is a schematic illustration of an example of a pressure wave system which may be employed downhole for creation of one or more pressure waves used to perform a desired activity, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system for controlled creation of pressure waves in a downhole environment. The technique enables creation of, for example, dynamic underbalance (DUB) pressure waves or dynamic overbalance (DOB) pressure waves which can be used to perform desired activities downhole. As described in greater detail below, a DUB pressure wave is created by pumping fluid out of a pressure chamber to create a relatively lower pressure in the pressure chamber. The lower pressure chamber is then rapidly opened to allow higher pressure fluid surrounding the pressure chamber to rush in and create the dynamic underbalance pressure wave. The DOB pressure wave may be created by pumping fluid into the pressure chamber to create a relatively higher pressure in the pressure chamber. The higher pressure chamber is then rapidly opened to allow the higher pressure fluid within the chamber to rush outwardly into the surrounding environment, thus creating the dynamic overbalance pressure wave.

The methodology and system described herein enable the controlled creation of desired DUB or DOB pressure waves (sometimes repeatedly) to generate positive effects in a borehole, e.g. a wellbore. According to an embodiment, a pump is coupled with a pressure chamber and conveyed downhole into a borehole to a desired location. The pump may be operated downhole to change a pressure level in the pressure chamber until a sufficient pressure differential exists between an interior and an exterior of the pressure chamber. A release mechanism, e.g. a valve, in communication with the pressure chamber is then rapidly opened to establish the desired pressure wave as the differing pressures equalize. Furthermore, the creation of controlled pressure waves may be repeated while the pump and pressure chamber remain downhole. As a result, desired pressure waves may be repeatedly created to achieve the desired positive effect in the borehole.

Examples of such desired positive effects include using a pressure wave to break apart scale and/or other brittle substances to help clear a pathway, e.g. clear out obstructions, along a primary wellbore. For example, a DUB pressure wave can be used to drag fluid and debris from inside perforations formed along a wellbore, to help clean deposits from a section of the wellbore, or to sample fluid from the reservoir/formation or from the wellbore. A suitable pressure wave also may be created and used to shear a structural member to thus allow a desired action such as activating a device or opening a valve or other pathway. The pressure waves also may be created and used in conjunction with acoustic monitoring equipment for observation and measurement of the consequences of the pressure waves interacting with a hydrocarbon reservoir and/or a completion, thus helping an operator analyze the nature of the reservoir and/or the wellbore. In seismic applications, the seismic waves reflect differently depending on the properties of rock near the pressure wave, and these differences provide useful seismic data. Accordingly, the pressure waves may be used to obtain desired seismic or micro-seismic data.

Pressure waves also may be created and used to determine the depth of a lateral section of a borehole by observing the time it takes for the pressure wave to reflect from the bottom of that pathway. If the pressure wave is generated inside a particular lateral borehole, the full distance to the bottom of the lateral can be calculated by knowing the time it takes a pressure wave to reflect off the bottom of the lateral borehole. By measuring the distance to the bottom of the lateral borehole, a particular lateral can be identified because lateral boreholes generally do not have the same measured depth.

Additionally, pressure waves may be created and used to generate force on a device in a wellbore. In some applications, suitable pressure waves may be created and used to free a device stuck in a wellbore. The stuck device may comprise a variety of devices including coiled tubing or other tubing, components of a bottom hole assembly (BHA), or a variety of other devices which may become stuck in a borehole. The directed pressure waves create shaking forces which act temporarily on the surface of the stuck device to free the device.

The pressure waves also may be used to increase the reach of a well string, e.g. a coiled tubing string, in a wellbore. For example, the pressure waves may be used to reduce or overcome friction acting on the well string in a horizontal section of the wellbore to thus facilitate movement of the well string and/or actuation of components of the well string. In some embodiments, the pressure waves may be used to provide an extra burst of power for increased force used to actuate downhole devices. For example, the increased force resulting from the pressure waves could be used to help shift sleeves to open or closed positions. The magnitude of forces generated by the pressure waves can be substantially higher than what would be achieved by pushing or pulling on the stuck device from the surface. Accordingly, a pressure wave or multiple pressure waves may be used in preparing or intervening in a wellbore to help extract hydrocarbons, e.g. oil and gas, via the wellbore.

Referring generally to FIG. 1, an example of a well system 30 for use in creating a pressure wave or pressure waves is illustrated. In this embodiment, well system 30 comprises a pump 32 operatively coupled with a pressure chamber 34 defined by a pressure chamber housing 35. By way of example, the pump 32 may be operatively coupled with pressure chamber 34 via a flow line 36. The well system 30 also comprises a release mechanism 38 in fluid communication with the pressure chamber 34. The release mechanism 38 may be rapidly opened to provide an opening or openings sized to enable rapid equalization of pressures when a pressure differential is established between an interior and an exterior of the pressure chamber 34. The fluid flow resulting from this rapid equalization of pressures creates the desired pressure wave. In some embodiments, pump 32 may pump fluid through a one-way valve or other suitable device which traps the relatively increased or decreased pressure in pressure chamber 34 until release mechanism 38 is actuated.

In the example illustrated, the pressure chamber 34 is generally cylindrical in shape and sized for movement down into a borehole 40, e.g. a wellbore. The pressure chamber 34 may be formed of steel or other suitable materials able to withstand substantial pressure differentials when the pressure inside of chamber 34 is either substantially increased or decreased relative to the surrounding, exterior ambient pressure. However, the pressure chamber 34 may be constructed from various materials suitable for downhole environments and in various shapes and sizes.

It should be noted the well system 30, including pump 32 and pressure chamber 34, is illustrated as deployed downhole in borehole/wellbore 40 to a desired location. By way of example, the desired location may be adjacent a plurality of perforations 41 extending from borehole 40 into a surrounding formation, e.g. a reservoir. The well system 30 may be deployed downhole into borehole 40 via a variety of conveyance methods. For example, the well system 30 may be positioned along coiled tubing or other type of well string. According to some embodiments, fluid can be delivered downhole via an interior of the well string/coiled tubing to, for example, pressure chamber 34. In some applications, the well system 30 can be conveyed downhole via wireline, slick line, or other suitable conveyance mechanisms.

The release mechanism 38 may comprise a valve 42 or other suitable mechanism which can be rapidly shifted between a closed and an open position. The valve 42 may be an automated valve which opens rapidly upon experiencing a predetermined pressure differential. However, valve 42 also may be a controllable valve which actuates in response to optical, electric or hydraulic control signals. In some one-time use applications, release mechanism 38 may be in the form of a rupture disc or other one-time mechanism.

According to some embodiments, the well system 30 also may comprise additional valves 44 positioned in communication with pump 32. The valves 44 may be actuated to, for example, allow discharge and/or inflow of fluid when pump 32 is operated to evacuate the interior of pressure chamber 34 or to pump fluid into the interior of pressure chamber 34. The valves 42, 44 may be addressable valves which may be opened automatically once a certain pressure differential is achieved, e.g. spring controlled valves. However, the valves 42, 44 also may be constructed for individual actuation in response to suitable signals, e.g. optical, electric or hydraulic signals.

Depending on the parameters of a given operation, the pump 32 may have various constructions. By way of example, the pump 32 may comprise a suction valve pump 46 which is electrically powered via electric current delivered from the surface via a control line 48, e.g. a power cable. For example, electrical power may be provided via control line 48 to a pump motor 50 which is operated to drive the suction valve pump 46. It should be noted that in some embodiments the pump 46 may be battery-powered. For example, downhole batteries 52 may be used as an alternative to power cable 48 or to provide a backup or supplement to power cable 48 when providing power for operating pump 46.

In some embodiments, the suction valve pump 46 may be operated via pump motor 50 via a rod, e.g. a sucker rod, coupled between the suction valve pump 46 and the pump motor 50. During evacuation of pressure chamber 34, for example, the suction valve pump 46 can be operated via many short strokes which cause the pressure chamber 34 to remain at a low internal pressure relative to the ambient pressure in the surrounding borehole 40. In this example, the suction valve pump 46 may be controlled such that if the rod of the suction valve pump is pulled sufficiently beyond a normal stroke distance, it opens pressure chamber 34 completely to allow ambient fluid to enter the interior of pressure chamber 34. In such an example, the long stroke of the pump rod could be used to open a designated release mechanism 38, e.g. one of the valves 42, 44.

Regardless, the opening created by opening release mechanism 38 is sufficiently large so that fluid dynamically rushes in to fill the interior of the pressure chamber 34 and to thus create the desired DUB pressure wave. Once equilibrium with the surrounding fluid has been achieved, the pressure chamber 34 can be closed again and the process repeated. Consequently, a desired DUB pressure wave may be controllably and repeatedly generated without returning the pressure chamber 34 or the pump 32 to the surface. For example, the frequency at which the pressure waves are generated may readily be controlled while the pressure chamber 34 and the pump 32 remain downhole. In some applications, the speed or frequency at which the pressure waves are created may be increased or decreased. The repeatability of the controlled pressure waves may be used to facilitate a variety of improved positive effects downhole. The same process can be used for creating repeat DOB pressure waves.

It should be noted that various types of pumps 32 may be used to change the pressure level within the pressure chamber 34 relative to the surrounding pressure to create a desired pressure differential. For example, different types of pumps 32 may be selected as suitable for displacing fluid at high differential pressures by creating a vacuum within pressure chamber 34 or a positive pressure within pressure chamber 34. In some embodiments, for example, the pump 32 should be able to generate a differential pressure between the interior and exterior of pressure chamber 34 having a factor of at least two, e.g. the exterior pressure would be two times greater than the interior pressure. For some embodiments, the flow rate of pump 32 may be relatively low but sufficient to create high magnitude pressure waves at a relatively low frequency, e.g. a low periodic frequency.

Rapid opening of the pressure chamber 34 to create the desired pressure wave also may be accomplished via various techniques and various release mechanisms 38. For example, a controller on pump motor 50 may be used to control a lever or device to open a desired valve 42, 44 to rapidly fill the pressure chamber 34. In some embodiments, the suction valve pump 46 may be operated via a sucker rod which can serve the dual purpose of evacuating the pressure chamber 34 with a series of shorter strokes and then opening the chamber 34 to allow fluid to dynamically enter the interior of the chamber as described above.

However, the valves 42, 44 or other types of release mechanisms 38 may be controlled electrically or hydraulically for instant actuation when creation of the pressure wave is desired. By way of example, the control line/power cable 48 may be constructed to carry electrical signals or may include additional control lines for carrying optical, electric or hydraulic signals to the release mechanism 38/valves 42, 44 to enable controlled actuation. Some valves or other release mechanisms 38 may be structured such that once the release mechanism begins to open, ambient fluid rushing through the mechanism helps force rapid completion of the opening so that any restriction to inflowing (or outflowing) fluid disappears very rapidly. The rapid flow of fluid enables the generation of substantial DUB or DOB pressure waves on command for use in creating a variety of beneficial effects. The configuration of pump 32 and pressure chamber 34 enables repeated creation of the desired pressure waves without retrieval of equipment to the surface.

Generally, underbalance pressure waves tend to be more powerful than overbalance pressure waves. This can be especially true when the ambient fluid is at high pressure as it is inside a wellbore. The magnitude of the ratio of difference in pressure defines the speed of the equilibrium waves that create the DUB or DOB pressure waves. A much higher ratio pressure can generally be achieved via creation of an underbalance in pressure chamber 34 compared to an overbalance. However, pressure chamber 34 and pump 32 can be used to create either type of pressure wave. In some applications, for example, DOB pressure waves may be generated to provide a burst of power that surges fluid at a high rate and high pressure into places which would not be affected by conventional pumping methods.

When an empty/low pressure chamber 34 is rapidly filled by surrounding high pressure fluid, the resulting DUB pressure wave produces an associated and directly proportional DUB force. The direction of the DUB force is generally oriented according to the direction from which the bulk of fluid flow enters the pressure chamber 34. For example, if there is more fluid below the pressure chamber and the opening in the pressure chamber 34 is on a bottom side, the bulk of the fluid will enter from below and hence the primary direction of the DUB force will be uphole. Conversely, if the pressure chamber 34 is near the bottom of a well so that more fluid is above the pressure chamber 34 and the opening is also on the top side of the pressure chamber 34, then fluid will enter from that direction and impact the bottom of the pressure chamber 34. This results in a DUB force directed downwardly.

Figure 2:
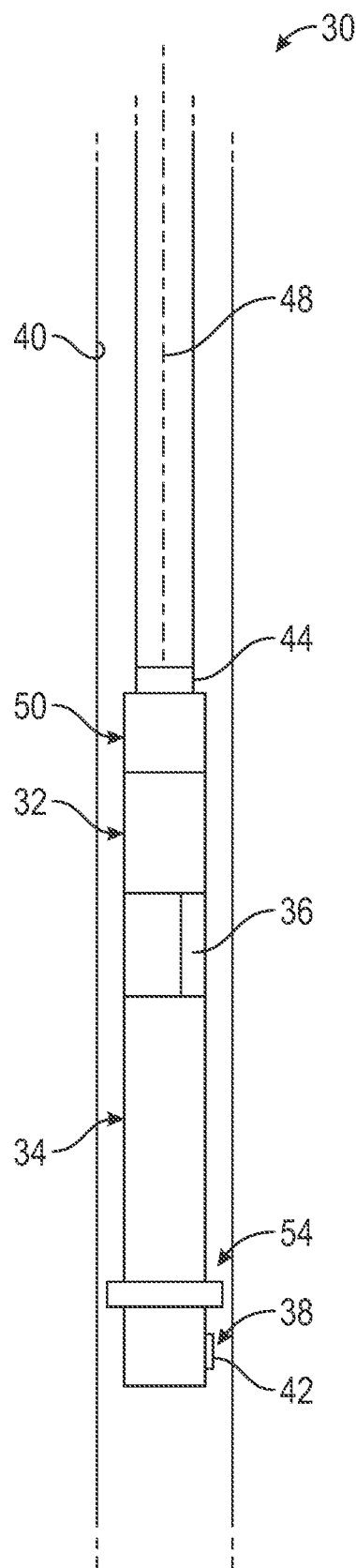
FIG. 2 is a schematic illustration of another example of a pressure wave system located downhole for creation of one or more pressure waves used to perform a desired activity, according to an embodiment of the disclosure.

In some applications, it is helpful to control the direction of the DUB force. To accomplish this, a directional mechanism 54 may be used to influence the direction of the DUB force (or the DOB force) as illustrated in FIG. 2. The directional mechanism 54 may comprise various types of mechanisms, e.g. gauge rings, positioned to control the direction along which fluid enters (or exits) the pressure chamber 34. For example, a gauge ring may be placed above or below release mechanism 38 to enable preferential filling (or discharge) of the pressure chamber 34 from the direction of desired force.

In addition to use of gauge rings to preferentially direct the fluid flow, the directional mechanism 54 may be in the form of a lower density gas. For example, the interior of the pressure chamber 34 may be filled with nitrogen or other lower density gas which easily expands without creating as much pressure loss for a given expansion compared to liquids. The different properties of the nitrogen or other lower density gas compared to liquid can be exploited to help direct forces. In this example, the DUB pressure wave travels slowly through nitrogen and rapidly through water or oil. This difference in pressure wave speed can be used to control the force direction and magnitude of the force.

In some applications, the opening associated with release mechanism 38 may be oriented and/or controlled so it allows fluid to enter the pressure chamber 34 in a given direction and/or at a given flowrate. The pressure chamber 34 also can be constructed such that it allows fluid to enter (or exit) the interior along a predetermined passageway and thus direction. This approach also can provide control and directionality to the DUB pressure wave and associated DUB force.

These techniques and mechanisms may similarly be used for DOB pressure waves. For some applications, DOB pressure waves may be used to provide a controlled burst of power. According to an embodiment, a "pill of fluid" may be pressurized within pressure chamber 34. By way of example, the pill may comprise viscous gel (to help carry solid debris) or acid (to help dissolve barriers between the hydrocarbon reservoir in the wellbore). The pump 32 is operated to pressurize the pill of fluid in the pressure chamber 34.

Once the pressure chamber 34 is opened via release mechanism 38, the pill of fluid is evacuated from the pressure chamber 34 at a much higher speed and pressure than could be achieved by pumping the fluid from the surface. As a result, the pill of fluid may permeate farther into the surrounding reservoir or break through other barriers. Such action can facilitate stimulating and treating various well conditions. In some embodiments, a well string, control line, or other flow line can be used to pump the desired fluid down to pressure chamber 34 so that the pill of fluid can be created, pressurized, and released multiple times.

It should be noted the configuration of well system 30 may change according to the parameters of a given operation and environment. Additionally, well system 30 may be deployed downhole via various types of conveyances. Well system 30 may comprise various types pumps 32, pressure chambers 34, release mechanisms 38, and/or other components to achieve the desired generation of pressure waves. In some applications, fluids may be pumped downhole to the pressure chamber 34. Ingress and egress of fluids with respect to the pressure chamber 34 may be automatically controlled or selectively controlled via appropriate control signals, e.g. optical, electric or hydraulic control signals.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
   a pressure wave system sized for deployment in a borehole, the pressure wave system comprising:
   a pressure chamber;
   a one-way valve coupled with the pressure chamber, the one-way valve configured to trap a pressure within the pressure chamber;
   a pump coupled with the pressure chamber via the one-way valve, the pump being operable to convey fluid into or out of the pressure chamber through the one-way valve, thereby changing the pressure in the pressure chamber to create a pressure differential between an interior and an exterior of the pressure chamber;
   a release mechanism in communication with the pressure chamber, the release mechanism being actuatable rapidly to an open position to create a pressure wave via fluid flow resulting from rapid equalization of pressures acting on the interior and exterior of the pressure chamber, the actuation of the release mechanism and operation of the pump being repeatable to enable creation of subsequent pressure waves while the pressure chamber remains downhole in the borehole; and
   a directional mechanism coupled with the pressure chamber, wherein the directional mechanism comprises a gauge ring disposed proximal to the release mechanism, wherein the gauge ring is configured to control a direction along which the fluid flow enters or exits the pressure chamber.

2. The system of claim 1, wherein power is supplied to the pump downhole via a cable, a battery, or both.

3. The system of claim 1, wherein the release mechanism comprises a valve.

4. The system of claim 1, further comprising equipment configured to obtain seismic data, micro-seismic data, or both, in response to one or more of the subsequent pressure waves.

5. The system of claim 1, further comprising equipment configured to obtain depth information related to a later section of the borehole in response to one or more of the subsequent pressure waves.

6. The system of claim 1, wherein one or more of the subsequent pressure waves is created to clean perforations, remove deposits formed along the borehole, free a stuck device, draw fluid from the borehole or a surrounding reservoir for sampling the fluid, or increase a reach of a coiled tubing string in the borehole by overcoming friction acting on the coiled tubing string, or a combination thereof.

7. The system of claim 1, wherein the pump comprises a suction valve pump.

8. A method for use in a well, comprising:
   conveying a pressure chamber downhole into a borehole;
   changing a pressure level in the pressure chamber by pumping a fluid into or out of the pressure chamber through a one-way valve coupled with the pressure chamber while a release mechanism coupled with the pressure chamber remains closed, thereby creating a pressure differential between an interior of the pressure chamber and an exterior of the pressure chamber;
   trapping the changed pressure level in the pressure chamber using the one-way valve; and
   rapidly opening the release mechanism coupled with the pressure chamber to create a pressure wave in the borehole via fluid flow between the borehole and the pressure chamber resulting from a rapid reduction of the pressure differential; and
   directing the fluid flow along the borehole using a directional mechanism coupled with the pressure chamber, wherein the directional mechanism comprises a gauge ring disposed proximal to the release mechanism, wherein the gauge ring is configured to control a direction along which the fluid flow enters or exits the pressure chamber.

9. The method of claim 8, further comprising using the release mechanism repeatedly to create multiple pressure waves at increasing or decreasing frequency.

10. The method of claim 8, further comprising closing the release mechanism and changing the pressure level in the pressure chamber to create a subsequent pressure differential without removing the pressure chamber from the borehole.

11. The method of claim 10, further comprising opening the release mechanism to create an additional pressure wave.

12. The method of claim 8, wherein rapidly opening the release mechanism comprises actuating a valve to an open position.

13. The method of claim 8, further comprising using the pressure wave to clean perforations, remove deposits formed along the borehole, or both.

14. The method of claim 8, further comprising using the pressure wave to obtain seismic or micro-seismic data.

15. The method of claim 8, further comprising using the pressure wave to obtain depth information related to a lateral section of the borehole.

16. The method of claim 8, further comprising using the pressure wave to free a stuck device.

17. The method of claim 16, wherein the stuck device comprises coiled tubing.

18. The method of claim 8, further comprising using the pressure wave to draw fluid from the borehole or a surrounding reservoir for sampling fluid.

19. The method of claim 8, further comprising using the pressure wave to increase a reach of a coiled tubing string in the borehole by reducing or overcoming friction acting on the coiled tubing string.

* * * * *